United States Patent [19]

Hyanova et al.

[11] Patent Number: 4,459,850
[45] Date of Patent: Jul. 17, 1984

[54] APPARATUS FOR PICKING-UP AND ANALYZING EMITTED ACCOUSTIC AND ULTRASONIC SIGNALS IN HOLLOW BODIES

[75] Inventors: Blanka Hyanova; Jiri Novotny, both of Prague, Czechoslovakia

[73] Assignee: CKD Praha, oborovy podnik, Prague, Czechoslovakia

[21] Appl. No.: 304,587

[22] Filed: Sep. 22, 1981

Related U.S. Application Data

[63] Continuation-in-part of Ser. No. 98,890, Nov. 29, 1979, abandoned.

[30] Foreign Application Priority Data

Nov. 29, 1978 [CS] Czechoslovakia .................. 7861-78

[51] Int. Cl.³ ............................................. G01N 29/00
[52] U.S. Cl. ........................................ 73/587; 73/703; 310/334
[58] Field of Search .................. 73/587, 702, 703, 801, 73/602, 579, 593, 660, 659; 310/334, 336

[56] References Cited

U.S. PATENT DOCUMENTS

| | | | |
|---|---|---|---|
| 3,166,730 | 1/1965 | Brown et al. | 310/334 |
| 3,393,557 | 7/1968 | Brown et al. | 73/579 |
| 3,531,983 | 10/1970 | Heath et al. | 73/579 |
| 3,548,648 | 12/1970 | Weichbrodt et al. | 73/593 |
| 3,580,057 | 5/1971 | Seegmiller | 310/328 |
| 3,587,561 | 6/1971 | Ziedonis | 310/335 |
| 3,786,285 | 1/1974 | Reibold | 310/330 |
| 3,793,627 | 2/1974 | Darrel et al. | 73/593 |
| 3,942,049 | 3/1976 | Hyanova et al. | 310/338 |
| 4,216,403 | 8/1980 | Krempl et al. | 310/334 |

Primary Examiner—Anthony V. Ciarlante

[57] ABSTRACT

Apparatus for picking-up and analyzing emitted accoustic and ultrasonic signals by means of a piezoelectric pick-up element connected to an amplifier with high input resistance, the output of the amplifier being connected for further evaluation to selective circuits and to an evaluation device. The piezoelectric pick-up element is situated in a casing, said casing being fixed to a hollow body being tested as by a strap encompassing at least partly both the casing and the tested hollow body.

1 Claim, 3 Drawing Figures

APPARATUS FOR PICKING-UP AND ANALYZING EMITTED ACCOUSTIC AND ULTRASONIC SIGNALS IN HOLLOW BODIES

This application is a continuation-in-part of application Ser. No. 098,890, filed Nov. 29, 1979 now abandoned

BACKGROUND OF THE INVENTION

The invention relates to an arrangement for picking up and analyzing accoustic and ultrasonic signals in hollow bodies due to internal overpressure and the diagnostic responses of the hydraulic and mechanic processes in said body.

A number of methods are known for measuring the course of internal overpressures in hollow bodies. Indirect methods based on the picking-up of deformations of an elastic body in dependence on variations of the internal overpressure are mostly used with the diagnosis of a hollow body without dismantling it. Piezoelectric pick-up devices are generally used for this purpose, such devices having high sensitivity and good capability of reproducing results. A major drawback of these known pick-up devices for measuring overpressures is the practical impossibility of eliminating a fault signal, caused by bending vibrations of the hollow body. These vibrations, generated in the course of operation of the hollow body, cause changes of its geometric shape independently of the course of overpressure in said body; such vibrations change the response of commonly used pick-up devices. In consequence thereof, different electric filters, mostly low pass filters, are used for the suppression of these parasitic frequencies in pick-up devices of known design. However, with such last devices the real course of the internal overpressure in a hollow body is distorted, since the signal proper lacks the high frequency components, which are important for the analysis of the course of internal overpressure.

These drawbacks are, with certain restrictions, eliminated by the pick-up device described in the U.S. Pat. No. 3,942,049. The pick-up device, according to such invention, has a body with steel inserts, transmitting elements and piezoelectric plates with a predetermined stiffness; this pick-up device by its constructional arrangement eliminates parasitic bending vibrations and detects variations of the internal overpressure. In some uses of such device for diagnosis without dismantling the hollow body, the pick-up device has certain restrictions. Its external dimensions do not permit its use in places where a small space is available in the neighborhood of the measured body. Its installation requires access from practically all sides of the hollow body, which cannot always be insured due to the design of the device of the body and its environment. In certain cases the pick-up device, according to said U.S. Pat. No. 3,942,049 can be applied only for one external diameter of the measured body for which it has been designed. In many cases, however, this dimension varies according to variations of manufacturing tolerances; when the diameter of the body and of the internal diameter of the pick-up device exceeds a certain value, the accuracy and reliability of the results of the diagnostic measurements decreases, since the internal diameter of the pick-up device is not adjustable.

Furthermore, information obtained from actual diagnostical measurements show that it is possible to utilize the emitted ultrasonic signals picked-up from a hollow body with internal overpressure to obtain a true picture of the course of hydraulic and mechanical processes taking place in the measured body (for instance, the determination of the start of the fuel supply by an injection pump into the cylinder of an internal combustion engine). These hydraulic and mechanical processes generate emitted ultrasonic signals in the measured body, the time course and amplitude thereof varying simultaneously with the occurence or with the intensity of these processes.

For picking-up emitted ultrasonic signals, a number of known pick-up devices are used; these, however, have different drawbacks for some applications. These known pick-up devices can be arranged on the measured place only by means of special wave guides, usually requiring the forming of threaded openings on the body at the place of measurement. These openings reduce the strength of the body, and in some cases they cannot be made because of constructional reasons. The making of these openings increases the amount of labor required prior to performance of the proper measurement. These known pick-up devices are, in addition, of large dimensions and are relatively heavy, which is undesirable particularly in operation with hollow bodies exposed to shocks.

Known pick-up devices for the determination of the course of internal overpressure, and pick-up devices for picking-up emitted ultrasonic signals are single-purpose devices, and none of them permits the picking-up of a combined signal comprising both information about the course of internal overpressure and about the course of the ultrasonic signal.

The present invention has among its objects the provision of an apparatus for picking up and analyzing accoustic and ultrasonic signals in hollow bodies, such apparatus being able to be adapted quickly and without previous adjustment of the surface of the measured hollow body. Another object of the invention is to provide an apparatus for low weight, small dimensions, low cost, which is easily adjusted for measurements on bodies of different diameters and on bodies with limited surrounding space.

According to the present invention, a piezoelectric pick-up device is connected with the input of an amplifier having high input resistance, at least one first selective circuit being connected to the output of the amplifier. The first selective circuit has a frequency range in the accoustic range of band. Also connected to the output of the amplifier is at least one second selective circuit with a frequency range in the ultrasonic band, the second selective circuit being connected in parallel with the first selective circuit, the outlets of both selective circuits being connected with the input of an evaluating unit, which may be, for instance, an oscilloscope.

The pick-up device is constituted by the piezoelectric plate having two sides; one side is cemented on to a copper layer coating a laminated plate such as a support of printed circuits, while the other side is cemented on to a copper foil which forms a protective casing for the pick-up device and is shaped in such a manner that between the layer of the laminated plate a spacing is provided, said spacing being designed for pushing through a strap to attach the device to the body to be examined. An aperture provided in the laminated plate serves for passing the core of a shielded coaxial cable which is soldered on to the copper layer of the laminated plate; the cable shield is soldered on to the copper layer of the other side of the laminated plate where also the protective copper foil is soldered.

DESCRIPTION OF THE DRAWINGS

An exemplary embodiment of an apparatus, according to this invention, is schematically shown in the attached drawings wherein:

With reference to FIGS. 1 and 2, a piezoelectric pick-up device 1 is connected by means of a coaxial cable 2 with the input side of a charge amplifier 3 comprising transistors T1, T2 and a complementary pair of transistors T3, T4, said pairs being connected within a Darlington circuit. Resistors R1, R2 and R3 serve for adjusting appropriate working points of said transistors. The output side of the charge amplifier 3 is connected to a first selective circuit 4 of low frequency pass filter type with adjustable frequency band (0 to 5 kHz), said circuit constituting an operating amplifier OA1 in the feedback of which a RC member (R6=R5, C1=C2) is interconnected; the time constant of the latter is selected in such a way that the critical frequency of the low pass filter may correspond to the upper limit of the frequency band. Parallel to the selective circuit 4, there is connected at least one second circuit 5 of an ultrasonic band pass filter which includes a transistor T5; in the collector of said transistor T5 there is interconnected a band pass filter (L, C4, C5), the band of which is adjusted in dependence on the particular diagnostic problem. For the diagnostics of injection systems of internal combustion engines, it is necessary to operate with e.g. three ultrasonic bands which means that the output side of the charge amplifier 3 will be connected to four selective circuits. The output side of the band pass filter is connected to an operating amplifier OA2 with adjustable input signal level. The outputs of the selective circuits 4 and 5 are connected to the input of an evaluation unit 6, which in the simplest cases can be an oscilloscope.

FIG. 3 shows a piezoelectric pick-up device 1, the structure of which allows the pick-up of a voltage wave in the body, said wave being generated by a change in internal overpresssure and by both hydraulic and mechanical impacts. It is therefore necessary that the presence of any additional mass downstream of a piezoelectric plate 7 be as low as possible to prevent oscillation of such mass, and that the pick-up device be pressed on to the body to be examined by such a force as to minimalize any accoustic losses in the pass between the pick-up device and the body.

Figure 1:
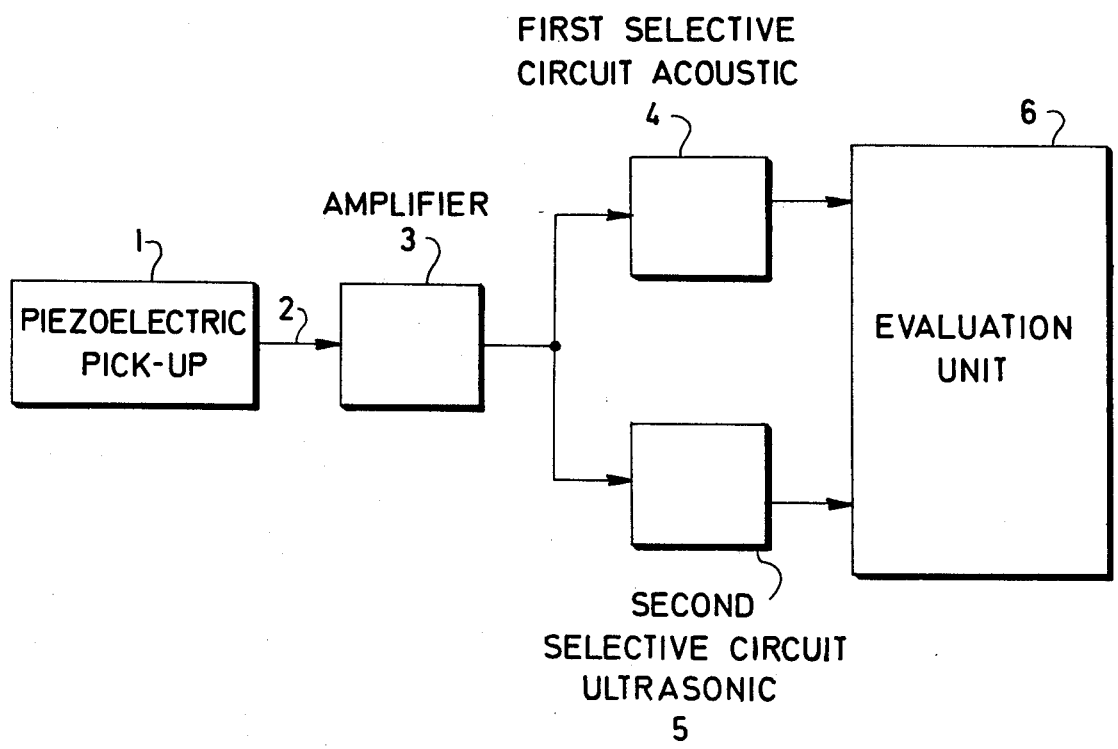
FIG. 1 is a block wiring diagram of the electric circuits.
Figure 2:
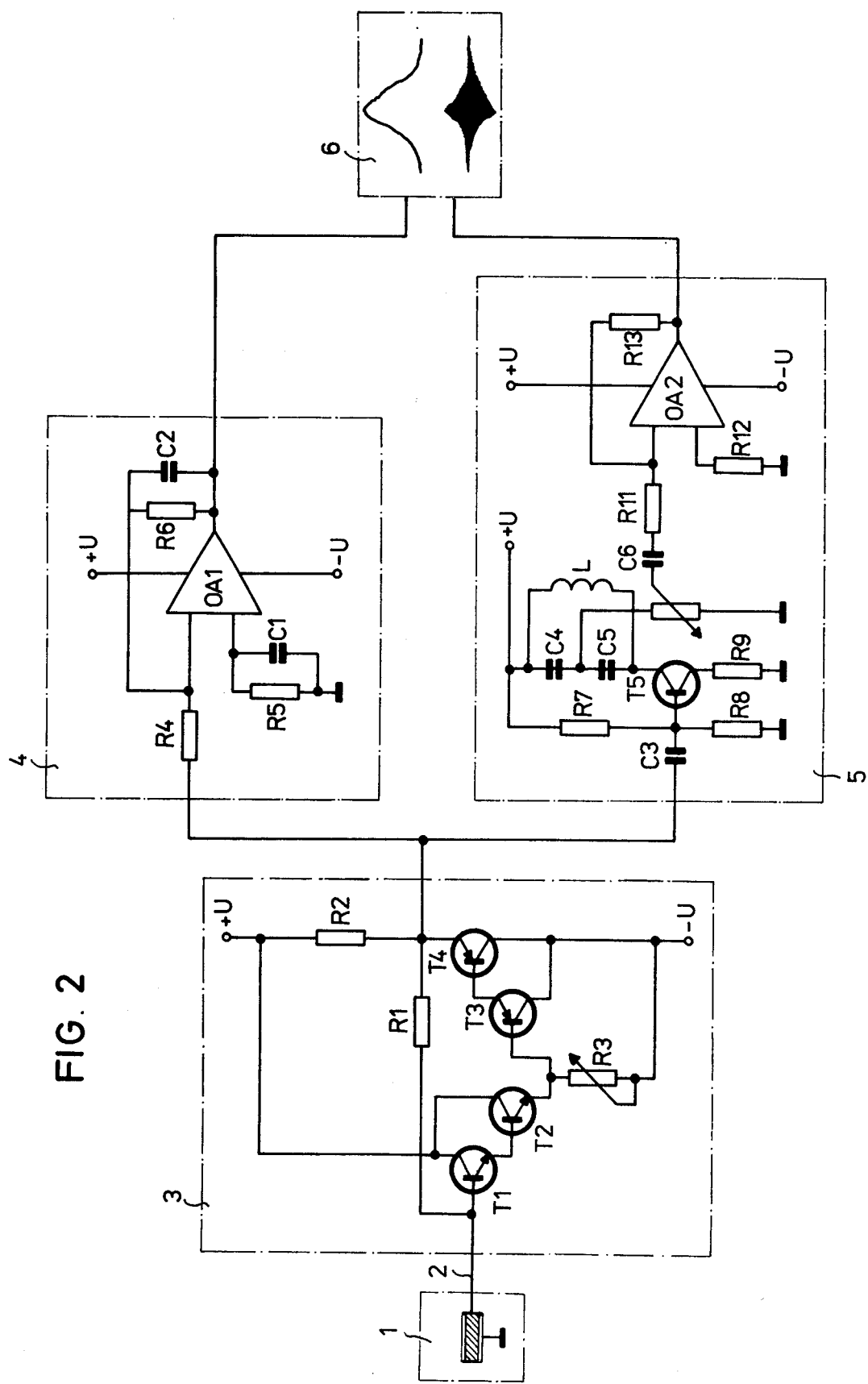
FIG. 2 is a wiring diagram of the circuits indicated in FIG. 1.
Figure 3:
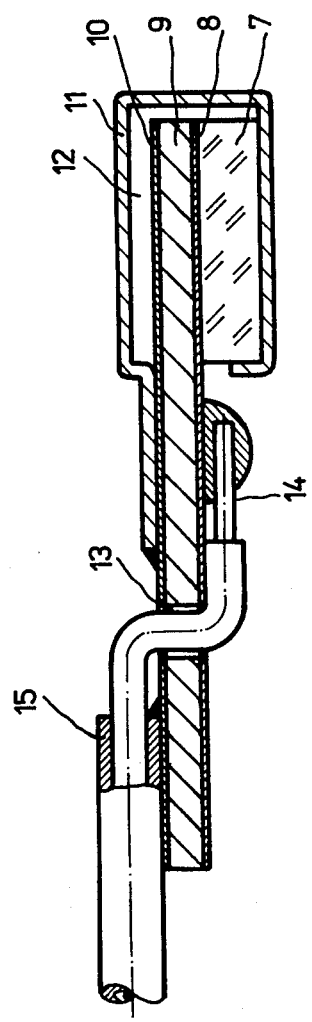
FIG. 3 is a sectional view of a piezoelectric pick-up device, the section being taken along a plane perpendicular to the axis of the body to be measured.

The pick-up device 1 is constituted by the piezoelectric plate which has two sides; one side (the lower side in FIG. 3) is cemented on to a copper layer 8 coating a laminated plate 9 such as a support of printed circuits, while the other (upper) side is cemented on to a copper foil 11 which forms a protective casing for the pick-up device and is shaped in such a manner that between the layer 10 of the laminated plate 9 a spacing 12 is provided, said spacing being designed for pushing through a strap to attach the device to the body to be examined. An aperture 13 provided in the laminated plate 9 serves for passing the core of a shielded coaxial cable 14 which is soldered on to the copper layer 8 of the laminated plate 9; the cable shield 15 is soldered on to the copper layer 10 of the other side of the laminated plate 9 where also the protective copper foil 11 is soldered.

The apparatus according to this invention operates as follows.

Due to variations of the internal overpressure, and due to mechanical and hydraulic processes in the interior of the hollow body to be measured, shock or impact waves are generated which are propagated through the body at a sonic speed toward the piezoelectric plate 7 of the pick-up device 1; thus a corresponding electric voltage will arise on its coatings. Such a voltage can be picked up, for example, by the coaxial cable 2 and led to the input of the charge amplifier 3 which makes it possible, without any current load upon the pick-up device, to transmit said voltage, without being amplified, to the output of said charge amplifier 3. Since such a voltage signal is combined (comprising both low-frequency components corresponding to an overpressure variation in the body, and high-frequency ones of emitted ultrasonic signals) it is necessary to separate these components from each other for solving the diagnostic problems. This is cared for by parallel-connected selective circuit 4 and 5, the latter being of a low-frequency pass filter type and the former of the type of active band pass filters with a mean frequency within an ultrasonic band.

The number and the frequency range of the selective circuits is determined with regard to demands on the details of diagnostic data comprised in the combined signal. Thus, for instance, for processing a signal picked up on the surface of the injection pump of internal combustion engine, four selective circuits should be availed of, from the diagnostic viewpoint, the circuits having the following ranges:

1st range: 0 to 5 kHz
  for picking up the course of injection pressure in the pump;
2nd range: 90 to 110 kHz
  for determining the start of injection pump supply;
3rd range: 390 to 410 kHz
  for detecting the mechanical condition of the pump;
4th range: 690 to 710 kHz
  for determining the end of injection pump supply.

The arrangement, according to this invention, is particularly designed for the technical diagnosis of internal combustion ignition engines, of compressors, pressure vessels and conduits of steam, hydraulic and pneumatic systems. It can be advantageously applied particularly where it has to be quickly adjusted to the dimensions of the measured body, and where high requirements are made on an easy installation without previous mechanical adjustment of the surface of the measured body. Its design offers a substantial advantage in economy due to its low weight, small dimensions, low consumption of material, and low amount of labor required in its manufacture.

Although the invention is illustrated and described with reference to one preferred embodiment thereof, it is to be expressly understood that it is in no way limited to the disclosure of such a preferred embodiment, but is capable of numerous modifications with the scope of the appended claims.

We claim:

1. An apparatus for picking up and analyzing emitted acoustic and ultrasonic signals in hollow bodies, comprising a piezoelectric pick-up device, a charge amplifier, at least one first selective circuit of the low-frequency pass filter type, at least one second selective circuit of the ultrasonic frequency band pass filter type, and an evaluating device, the piezoelectric pick-up device being connected to the input side of the charge amplifier the output side of which is parallel-connected to at least one first selective circuit and to at least one second selective circuit, the outputs of said selective circuits being connected to the input of the evaluating device, the piezoelectric pick-up device comprising a laminated plate coated at both sides with copper layers, the side of said plate facing the measured body being provided with a piezoelectric plate the other side of which is cemented to a copper foil forming a protective casing of the apparatus, said casing being shaped so that between itself and the respective layer of the laminated plate, a spacing is provided which is designed for a strap for attaching the apparatus to the measured body, the laminated plate being provided with an aperture for the core of a shielded coaxial cable soldered on the copper layer of the laminated plate while the cable shield is soldered on the opposite copper layer of the laminated plate, to which the protective copper foil of said casing is also soldered.

* * * * *